Patented Oct. 31, 1939

2,178,383

UNITED STATES PATENT OFFICE 2,178,383

CARBON BLACK

William B. Wiegand, Old Greenwich, Conn., assignor to Columbian Carbon Company, New York, N. Y., a corporation of Delaware No Drawing. Application June 17, 1927, Serial No. 148,666

13 Claims. (Cl. 134—58)

This invention relates to improvements in the production of commercial carbon black and lamp black, and includes not only new processes for the production of such blacks, but the new and improved blacks produced.

The type of blacks to which this invention relates are the commercial carbon blacks, commonly produced by the so-called impingement processes, and the lamp blacks, both of which have a relatively high oxygen content, which may range as high as 7% or even higher. The invention is not applicable to the treatment of the thermal blacks or other blacks including impingement blacks which have been subjected to a deactivating heat treatment in a non-oxidizing atmosphere to reduce their oxygen content. There is a sharp difference between these two types of blacks, that is, between the commercial carbon blacks and lamp blacks which have a relatively high oxygen content and which are produced in a more or less oxidizing atmosphere, and the thermal blacks or deactive heat treated blacks which have been subjected to a reducing or non-oxidizing atmosphere at high temperatures and have a relatively low oxygen content; and it is because of this difference in the blacks, produced by these different processes, that the blacks themselves have properties such as to make the present invention applicable to the commercial carbon blacks and lamp blacks but not to the blacks produced in a reducing or non-oxidizing atmosphere or subjected to the same at high temperatures to reduce their oxygen content.

If a commercial carbon black or lamp black be boiled for 15 minutes or more in from 3 to 10 parts of distilled water and the mixture then be cooled and the supernatant liquid decanted, the resulting sludge, when placed in contact with the glass electrode of a pH electrometer, gives a pH reading which is generally in the range of from about 2.5 to about 5.0 or even a little higher, and which is characteristic of the particular black selected. Thermal blacks, and blacks which have been subjected to a suitable deactive heat treatment, when treated by similar technique, give sludges which are alkaline, having pH's ranging from about 8.0 to 10.0 or even somewhat higher. Similarly, the supernatant liquid which is decanted has a more or less characteristic pH value, depending upon the particular blacks treated, and also depending to some extent upon the conditions of treatment; and the pH's of the supernatant liquids in general parallel the pH's of the sludges, although they are not as sharply demarcated. Similarly, when carbon blacks are suspended in cold distilled water, the suspensions or slurries assume more or less characteristic pH values, although again not as sharply demarcated or defined as the pH's of the sludges referred to above. In this specification, and the appended claims, when "an aqueous sludge pH" is referred to, the reference is to the pH of a sludge obtained by boiling a carbon black or other colloidal carbon pigment in from 3 to 10 parts of distilled water for about 15 minutes, cooling the mixture, and decanting the supernatant liquid.

The reason for the formation of such acid sludges by carbon blacks and lamp blacks is not too clear, but I believe that it is due to adsorption by the blacks of OH ions formed in the water by ionic dissociation. It is certain that it is not due to the presence of mineral or extractable acid, because careful tests have shown that there is not sufficient mineral or extractable acid present in any of these blacks to account for the marked reduction in pH of distilled water which the carbon blacks and lamp blacks produce. In general, the blacks which form the most acid sludges have the highest content of oxygen, and are the most readily dispersed in use.

These acid properties of the carbon blacks and lamp blacks apparently are responsible for imparting to the blacks certain disadvantages. In general, when used in rubber, for example, the blacks with the normal oxygen content and which form definitely acid sludges, disperse the most readily; but they have a distinct tendency to retard the vulcanization of the rubber. Similarly, when used in paints, lacquers, and the like, high oxygen blacks disperse the most readily but have a decided tendency to slow up the drying of the paint or lacquer. The effect of this is that it is necessary to choose between a black which will give maximum dispersion with relatively great retardation of rate of vulcanization or rate of drying, and a black which will give faster vulcanization or faster drying, but not as great dispersion and hence will not produce a final product, be it a rubber product, paint, lacquer or the like, as good as that produced by the black having the higher oxygen content and giving the more acid sludges; or else to seek a balance between these effects, compromising on a black which will not retard vulcanization or drying, as the case may be, too much, and yet will disperse satisfactorily.

The present invention provides carbon blacks or lamp blacks which by suitable treatment have the dispersing and reinforcing properties of the original blacks, which are more or less coupled with their oxygen content, enhanced, while at the same time having a greatly reduced tendency to retard vulcanization or drying. Thus by the present invention blacks are produced which when used in rubber, paints, lacquers or the like yield products which have the rapid vulcanizing or drying properties of compositions produced with the use of such materials as deactive heat treated blacks, while at the same time having desirable characteristics due to high dispersion of the black. It is applicable to the types of particulate carbon which give aqueous sludges having pH's ranging from around 2.5 to about 5.0 or somewhat more, but definitely acid, thus being applicable to the commercial carbon blacks and lamp blacks.

In accordance with the present invention, a commercial carbin black or lamp black is treated with an equeous solution or suspension of a substance which will cause it to adsorb a fixed alkali, but which is free from any radicals or materials which is present in the black finally obtained might exert a deleterious effect on compositions in which the black might be used, such as materials which might introduce sulfur acids, selenium, tellurium, or any of the halogens, any of which, if present even in minute quantities, in a black, would be objectionable if the black were intended for use in rubber manufacture or as a pigment for paints, lacquers or the like. The invention is based upon the discovery that the carbon blacks and lamp blacks not only will attract the OH ions from distilled water, but will adsorb alkali from solutions or suspensions of alkalies or alkaline salts in which free alkali is formed by hydrolysis. The black with the alkali so adsorbed forms aqueous sludges having raised pH values, and blacks so treated are free from the objectionable properties of the acid blacks, so that, when used in rubber, or in paints, lacquers or the like, they do not retard vulcanization or drying. At the same time, the neutralized blacks have the dispersing and reinforcing properties of the original blacks enhanced, so that the only apparent effects of the treatment on the blacks, when the blacks are used, is the marked decrease in the retardation of vulcanization or drying, and the improved dispersion of the black.

The alkali which is adsorbed by the blacks is very strongly held, only a minor proportion of it being extractable by repeated washing with hot water; and the new products are in no way similar to simple admixtures of carbon black or lamp black and alkali. In the new products, there is little or no free alkali, and they do not produce any deleterious effect on rubber, paints, lacquers or the like such as would be produced by any substantial content of free alkali. Nor do the new products contain any such materials as sulfur acids or the halogens, either free or combined, which would exert a deleterious effect on rubber or the like.

A wide range of substances are available for the neutralization of carbon blacks and lamp blacks in accordance with the present invention. Included among these materials are the hydroxides of the alkali metal and alkaline earth metals, such as caustic soda, caustic potash and lime, as well as a number of the salts of these metals, including the carbonates, phosphates, silicates, and borates, particularly such of these salts as are water soluble. All of these substances, when brought into contact with carbon black or lamp black in aqueous suspension, as by suspending the black in an aqueous solution or suspension of one of them, effect a neutralization of the carbon black and an increase in the pH of the aqueous sludges which it might form. The free hydroxides apparently are adsorbed as such; whereas when the treatment is effected by means of a salt of one of these metals, such as sodium phosphate, the black apparently adsorbs the caustic soda which is formed by hydrolysis, and releases in the water phosphoric acid or an acid salt thereof. Where a simple base is used, it is only necessary to remove the excess of water and dry the carbon black; whereas when a salt is used, the black may be subjected to more or less complete washing after the treatment with the salt so as to remove free acid formed. In effecting this adsorption, sufficient time of contact of the solution and the black to afford reasonable completeness of the adsorption should be used. Generally, a period of contact of from ½ hour to 1 hour is sufficient, but with high color blacks or the like, it may be advantageous to use a longer period of contact. The suspension is advantageously heated, e. g., to near the boiling point of water, as such heating promotes the adsorption.

It is important, in carrying out the present invention, that sufficient alkali be adsorbed on the black to raise the pH of its aqueous sludge to a value ranging from about 6.0 to 9.0, i. e., to substantial neutrality, as it is only within this range that the adventures of the invention can be fully realized. It is for this reason that it is important that the alkali adsorbed be a fixed alkali, such as the alkalies formed by the alkali metals or the alkaline earth metals, as ammonium hydroxide, for example, is not adsorbed in sufficient quantities by the black to permit the production of blacks having aqueous sludge pH's in the range of about 6.0 to 9.0. A carbon black treated with aqueous ammonia, for example, does show an increase in pH of its aqueous sludge, but the increase is not sufficient to be of real value. For example, in one typical case, a carbon black was treated with solutions of ammonium hydroxide of increasing strength, to see if by the use of a sufficiently strong solution, a black having an aqueous sludge pH in excess of 6.0 could be obtained. It was found that as the concentration of the solution was increased, the pH of the aqueous sludge increased, but approached a value of about 5.5 as an asymptote; and apparently, irrespective of the concentration of the ammonium hydroxide, the carbon black could not be forced to adsorb sufficient ammonia so that it would have an aqueous sludge pH in excess of 6.0.

Also, in practicing the invention, the alkali or salt used as a source of alkali must not contain materials which would be deleterious to rubber, paints, lacquers, or the like. Thus the use of such salts as sulfates or chlorides is precluded, because when such salts are used, there always remains in the black obtained a small amount of the corresponding free acid.

The invention will be further illustrated by the following examples, although it is not limited thereto.

*Example 1.*—A rubber grade of commercial carbon black having an aqueous sludge pH of about 4 is heated with about 7 times its weight of water containing 0.25% of caustic soda based upon the carbon black, care being taken that the carbon black is thoroughly wet with the solution so that the caustic soda is uniformly adsorbed by the black. The black, carrying the adsorbed caustic soda, is separated from the water and dried. The product so produced has an aqueous sludge pH somewhat above 7. The caustic soda is strongly adsorbed by the black and forms a more or less permanent combination with the carbon particles, as is shown by the fact that only about 1/6 of it can be removed by repeated extractions with hot distilled water. The alkali is not present in a free state, and does not produce any deleterious effects when the carbon black is used, for example, in rubber, such as would be caused by free caustic soda. The treated carbon black disperses in a dry rubber mix somewhat better than the original carbon black, and it does not exert the retarding effect on the vulcanization of the rubber exerted by the original, unneutralized black, and thus enables the production of a rubber having improved properties because of the less drastic vulcanization required, and enables a substantial saving in the amount of accelerator required.

*Example 2.*—A high color carbon black having an aqueous sludge pH of about 3.0 is treated with an aqueous solution of calcium hydroxide, containing from 3.0 to 4.0% of calcium hydroxide calculated on the carbon black. The black adsorbs the calcium hydroxide, and, after removal of the water and drying, still carries the calcium hydroxide strongly adsorbed. The product has an aqueous sludge pH between about 8.0 and 9.0. When used as a pigment, the resulting black disperses somewhat better than the original black, giving a paint or lacquer of improved gloss, jetness and stability, without the retarded drying of paints containing the unneutralized black.

*Example 3.*—A commercial carbon black of rubber grade, having an aqueous sludge pH of about 4.0, is agitated with several times its weight of water containing about 0.4% of trisodium phosphate based on the carbon black. The black is then dried. The resulting product has an aqueous sludge pH somewhat greater than 6.0.

*Example 4.*—A rubber carbon black having an aqueous sludge pH of about 3.5 is treated with a hot aqueous solution of caustic soda containing 0.20% caustic soda based on the black. The product obtained after drying has an aqueous sludge pH of 7.3. By repeated washing with hot water, the aqueous sludge pH is reduced only to about 6.8, and only 0.06% of caustic soda, based on the black, is extracted. The same black, treated with 0.25% of caustic soda, yields a product having an aqueous sludge pH of 7.7. By repeated washing with hot water, this may be reduced only to about 7.3, with extraction of 0.09% of caustic soda, based on the black. Again, the same black, treated with 0.325% of caustic soda, yields a product having an aqueous sludge pH of 8.5, which after repeated washing with hot water is reduced only to 7.7, with extraction of 0.135% of caustic soda, based on the black.

The amount of alkali or salt required to effect the desired increase in aqueous sludge pH to a value ranging between about 6.0 and 9.0 will vary quite widely, depending upon the nature and original aqueous sludge pH of the black treated, the particular alkali or salt used, and the particular aqueous sludge pH desired in the final product. In general, an amount of alkali or salt will be required corresponding to or equivalent to from 0.2% to 2.0% of caustic soda, based on the black.

The alkali adsorbed by the black is strongly held, and a characteristic feature of the new blacks is that their aqueous sludge pH's are not reduced below about 6.0 even after repeated extraction with hot or cold water, showing that a substantial amount of the alkali cannot be extracted with water. In general, more than 50% of the alkali cannot be extracted, although with certain of the blacks, having high aqueous sludge pH values approaching 9.0 somewhat more than 50% of the alkali may be extractable. As is shown in Example 4 above, as the amount of alkali adsorbed by a black is increased, the proportion which is extractable tends to increase; but in any case, the amount of alkali extractable is not sufficient to permit reducing the aqueous sludge pH values of the new blacks below about 6.0. Where reference is made herein to extraction of treated black with water, it is to extraction with pure (pH 7.0) water.

An important characteristic of the dry commercial blacks and lamp blacks which have been produced in accordance with the present invention is their content of adsorbed, fixed alkali, which is present in such quantity as to cause them to form aqueous sludges having pH's ranging from about 6.0 to about 9.0, advantageously between 6.0 and 8.0, coupled with a relatively high oxygen content substantially the same as that of commercial carbon blacks and lamp blacks, as distinguished from such products as thermal blacks and heat deactivated blacks, which may form aqueous sludges having comparable pH values, but which do not have the desirable and important relatively high oxygen content and hence lack the dispersing and reinforcing properties of the new blacks.

An important application of the present invention lies in the treatment of the heat activated carbon blacks or lamp blacks which are produced by subjecting a carbon black or lamp black to temperatures ranging from about 300° C. to about 1000° C. in an oxygen containing atmosphere, which treatment results in an increase in the oxygen content of the black and an increase in its dispersing properties. The treatment of such blacks, which have a particularly high oxygen content, by the process of the present invention is particularly advantageous, as it enables the production of blacks having the advantages of the heat activation treatment and consequent increased oxygen content, with improved dispersing properties, while at the same time avoiding such disadvantages as this treatment might entail in increasing the tendency of the blacks to retard vulcanization or drying or the like. Thus all of the advantages of the so-called heat activated blacks, in which the blacks are subjected to high temperatures in an oxidizing atmosphere, which in general involve improvements in color and workability or ease of dispersion, are retained while at the same time a product is produced which when used as a pigment in a paint or lacquer or when used in rubber, does not retard the drying or vulcanization as do such heat activated blacks which have not been neutralized.

Thus it will be seen that by the present invention there is provided a new type of black, namely, a carbon black or lamp black carrying adsorbed, fixed alkali, the new blacks having aqueous sludge pH's ranging from about 6.0 to about 9.0, and having the dispersing and reinforcing properties of the original blacks from which they are formed enhanced and without objectionable retardation of vulcanization or drying when used in rubber mixes or as pigments in paints, lacquers or the like. Further, the new carbon blacks or lamp blacks contain no radicals, ions, or compounds which might be deleterious to compositions in which the blacks might be incorporated, such as rubber or paints or lacquers or the like, and in this aspect are fully equivalent to the original untreated blacks. The primary effect of the treatment of the invention is to overcome certain objections which ordinary carbon blacks and lamp blacks having a relatively high oxygen content inherently have, either because of their high oxygen content or because of their tendency to adsorb hydroxyl ions or bases, with an enhancement of the desirable workability or ease of dispersement of the blacks.

I claim:

1. A substance of the class consisting of carbon blacks and lamp blacks carrying an adsorbed fixed alkali and having an "aqueous sludge pH" ranging from about 6.0 to about 9.0 which remains above about 6.0 even after repeated extraction of the black with water, said black having a normal oxygen content and being free from added sulfur acids, selenium, tellurium, and halogens, either free or combined.

2. A substance of the class consisting of carbon blacks and lamp blacks carrying an adsorbed fixed alkali in amount equivalent to from 0.2 to 2.0% of caustic soda and having an "aqueous sludge pH" ranging from about 6.0 to about 9.0 which remains above about 6.0 even after repeated extraction of the black with water, said black having a normal oxygen content and being free from added sulfur acids, selenium, tellurium, and halogens, either free or combined.

3. A substance of the class consisting of carbon blacks and lamp blacks carrying an adsorbed fixed alkali metal hydroxide and having an "aqueous sludge pH" ranging from about 6.0 to about 9.0 which remains above about 6.0 even after repeated extraction of the black with water, said black having a normal oxygen content and being free from added sulfur acids, selenium, tellurium, and halogens, either free or combined.

4. A substance of the class consisting of carbon blacks and lamp blacks carrying an adsorbed fixed alkali metal hydroxide in amount equivalent to from 0.2 to 2.0% of caustic soda and having an "aqueous sludge pH" ranging from about 6.0 to about 9.0 which remains above about 6.0 even after repeated extraction of the black with water, said black having a normal oxygen content and being free from added sulfur acids, selenium, tellurium, and halogens, either free or combined.

5. A substance of the class consisting of carbon blacks and lamp blacks carrying an adsorbed alkaline earth metal hydroxide and having an "aqueous sludge pH" ranging from about 6.0 to about 9.0 which remains above about 6.0 even after repeated extraction of the black with water, said black having a normal oxygen content and being free from added sulfur acids, selenium, tellurium, and halogens, either free or combined.

6. The process of producing improved substances of the class consisting of carbon blacks and lamp blacks which comprises treating, in the presence of water, a substance of this class with an alkaline material selected from the class consisting of alkali metal and alkaline earth metal hydroxides, carbonates, phosphates, silicates, and borates in sufficient quantity to raise the "aqueous sludge pH" of the black, after drying, to a value between about 6.0 and about 9.0, and drying the black so treated.

7. The process of producing improved substances of the class consisting of carbon blacks and lamp blacks which comprises treating a substance of this class with an aqueous solution of a compound from the group consisting of alkali metal and alkaline earth metal hydroxides in sufficient quantity to raise the "aqueous sludge pH" of the black, after drying, to a value between about 6.0 and about 9.0, and drying the black so treated.

8. The process of producing improved substances of the class consisting of carbon blacks and lamp blacks which comprises treating a substance of this class with an aqueous solution of an alkali metal hydroxide in sufficient quantity to raise the "aqueous sludge pH" of the black, after drying, to a value between about 6.0 and about 9.0, and drying the black so treated.

9. The process of producing improved substances of the class consisting of carbon blacks and lamp blacks which comprises treating a substance of this class with an aqueous solution of an alkaline earth metal hydroxide in sufficient quantity to raise the "aqueous sludge pH" of the black, after drying, to a value between about 6.0 and about 9.0, and drying the black so treated.

10. The process of producing improved substances of the class consisting of carbon blacks and lamp blacks which comprises treating a substance of this class with an aqueous solution of calcium hydroxide in sufficient quantity to raise the "aqueous sludge pH" of the black, after drying, to a value between about 6.0 and about 9.0, and drying the black so treated.

11. The process of producing improved substances of the class consisting of carbon blacks and lamp blacks which comprises treating a substance of this class with an aqueous solution of sodium hydroxide in sufficient quantity to raise the "aqueous sludge pH" of the black, after drying, to a value between about 6.0 and about 9.0, and drying the black so treated.

12. A substance of the class consisting of carbon blacks and lamp blacks neutralized with a material of the class consisting of fixed alkalies and inorganic alkaline salts free from radicals containing sulphur, tellurium, selenium and the halogens.

13. The process as in claim 6 in which the aqueous alkaline material is a salt, and in which the black after treatment with such material is washed with water to remove the acid set free.

WILLIAM B. WIEGAND.